US008601014B2

(12) United States Patent
Mungi

(10) Patent No.: US 8,601,014 B2
(45) Date of Patent: Dec. 3, 2013

(54) FILE IDENTIFICATION VIA UNIVERSAL FILE CODE

(75) Inventor: Ashish Mungi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/400,622

(22) Filed: Feb. 21, 2012

(65) Prior Publication Data

US 2013/0218854 A1    Aug. 22, 2013

(51) Int. Cl.
*G06F 7/02* (2006.01)
*G06F 7/06* (2006.01)

(52) U.S. Cl.
USPC ............................ 707/758; 707/687; 717/168

(58) Field of Classification Search
None
See application file for complete search history.

(56) References Cited

U.S. PATENT DOCUMENTS

| 7,801,871 | B2 | 9/2010 | Gosnell |
| 2008/0040388 | A1 | 2/2008 | Petri et al. |
| 2009/0228533 | A1* | 9/2009 | Reddy et al. ................. 707/204 |
| 2009/0265279 | A1 | 10/2009 | Mintz et al. |
| 2009/0265396 | A1* | 10/2009 | Ram et al. ..................... 707/204 |
| 2012/0029671 | A1* | 2/2012 | Millington et al. ............. 700/94 |

OTHER PUBLICATIONS

Schandl, SemDAV: A File Exchange Protocol for the Semantic Desktop, Proceedings of the Semantic Desktop and Social Semantic Collaboration Workshop, vol. 202, Nov. 2006, Athens, GA, 5 pp.
Altman et al, A Proposed Standard for the Scholarly Citation of Quantitative Data, D-Lib Magazine, vol. 13, No. 3/4, Mar./Apr. 2007, 10 pp.

\* cited by examiner

*Primary Examiner* — Charles Kim
*Assistant Examiner* — Miranda Huang
(74) *Attorney, Agent, or Firm* — Patrick J. Daugherty; Driggs, Hogg, Daugherty & Del Zoppo Co., LPA

(57) ABSTRACT

A unique, universal file code created for a file being created or saved for the first time has core elements that include an original device identifier; an original product identifier unique to a software product used to create or save the file; an original operating system identifier unique to an operating system used to create or save the file; an original user identifier unique to a user creating or saving the file; a checksum computed from a totality of a data content of the file; and a name of a checksum algorithm used to compute the checksum. The universal file code is added to file metadata or attributes for the new file and saved with the new file. Embodiments determine whether files are identical, related or not identical or related by comparing elements of their universal file codes.

17 Claims, 3 Drawing Sheets

FILE IDENTIFICATION VIA UNIVERSAL FILE CODE

BACKGROUND

Embodiments of the present invention relate to the construction and use of unique, universal file coding in the identification of files.

Multiple devices such as desktops, laptops, smart phones, MP3 players, etc., and networking options such as the internet, local area networks (LAN), and wide area networks (WAN), etc., and software platforms are each capable of accessing and handling files. Files may reside upon multiple devices and within multiple storage media, including portable hard disks, flash drives, pen drives, etc. Thus, any given file or its content may be present on multiple devices, or within multiple locations (directories, file folders, etc) on any given device.

It is known for multiple individuals to collaborate in the creation and sharing of files (documents, spreadsheets, etc) and their content (audio, video, photos, etc), over the internet, through emails, wikis, blogs, social networking sites, file sharing sites, or via peer-to-peer file-sharing software, etc. Multiple persons may send or receive multiple emails with the same file attachments, or the same file may be uploaded in multiple locations (for example, into team-rooms, repositories, wikis, etc).

Thus, any file or its content may be propagated in endless permutations throughout such devices and locations. Problems arise in tracking, harmonizing and consolidating files and file versions through multiple file handling iterations. Often one file is renamed multiple times, sometimes retaining its format each time, though some versions may be reformatted. A file may also be renamed along with a format change, such as a conversion of an audio file from Windows Media Audio (.wma) format to an MP3 (.mp3) format.

Preventing data file duplication or eliminating duplicate files (sometimes referred to as "data re-duplication"), or recognizing that files with the same name and format are actually different files with different content, may present challenges. Content comparison techniques, such as hash file comparisons and solutions which compare document text or byte data between different files, often fail to identify duplicates. They may also falsely determine file duplications when two files with the same file name, and perhaps even similar hash code representations of their data, are actually different files.

BRIEF SUMMARY

In one embodiment of the present invention, a method for utilizing a unique, universal file code for a file includes a processing unit determining if a new file is being created or saved for the first time, or if instead an existing file is being updated, modified, renamed, copied or moved, in response to a file command input. If a new file is being created or saved for the first time, core elements are determined that include an original device identifier unique to a device on which the new file is being created or saved for the first time; an original product identifier unique to a software product used to create or save the new file for the first time; an original operating system identifier unique to an operating system used to create or save the new file for the first time; an original user identifier unique to a user creating or saving the new file for the first time; a checksum computed from a totality of a data content of the new file; and a name of a checksum algorithm used to compute the checksum. If the new file is being created or saved for the first time, a plurality of extended elements are determined including a current file name of the file, a current format of the file, and a last-modified timestamp that comprises a time, date and time zone of a last creation or saving operation on the new file by the device. A universal file code is created for the new file comprising core and extended elements, and the created universal file code is added to file metadata or attributes for the new file and saved with the new file.

In another embodiment, a method includes integrating computer-readable program code into a computer system comprising a processing unit, a computer readable memory and a computer readable tangible storage medium. Computer readable program code is embodied on the computer readable tangible storage medium and comprises instructions that, when executed by the processing unit via the computer readable memory, cause the processing unit to determine if a new file is being created or saved for the first time, or if instead an existing file is being updated, modified, renamed, copied or moved, in response to a file command input. If a new file is being created or saved for the first time, core elements are determined that include an original device identifier unique to a device on which the new file is being created or saved for the first time; an original product identifier unique to a software product used to create or save the new file for the first time; an original operating system identifier unique to an operating system used to create or save the new file for the first time; an original user identifier unique to a user creating or saving the new file for the first time; a checksum computed from a totality of a data content of the new file; and a name of a checksum algorithm used to compute the checksum. If the new file is being created or saved for the first time, a plurality of extended elements are determined including a current file name of the file, a current format of the file, and a last-modified timestamp that comprises a time, date and time zone of a last creation or saving operation on the new file by the device. A universal file code is created for the new file comprising core and extended elements, and the created universal file code is added to file metadata or attributes for the new file and saved with the new file.

In another embodiment, a system has a processing unit, computer readable memory and a tangible computer-readable storage device with program instructions, wherein the processing unit, when executing the stored program instructions, determines if a new file is being created or saved for the first time, or if instead an existing file is being updated, modified, renamed, copied or moved, in response to a file command input. If a new file is being created or saved for the first time, core elements are determined that include an original device identifier unique to a device on which the new file is being created or saved for the first time; an original product identifier unique to a software product used to create or save the new file for the first time; an original operating system identifier unique to an operating system used to create or save the new file for the first time; an original user identifier unique to a user creating or saving the new file for the first time; a checksum computed from a totality of a data content of the new file; and a name of a checksum algorithm used to compute the checksum. If the new file is being created or saved for the first time, a plurality of extended elements are determined including a current file name of the file, a current format of the file, and a last-modified timestamp that comprises a time, date and time zone of a last creation or saving operation on the new file by the device. A universal file code is created for the new file comprising core and extended elements, and the created universal file code is added to file metadata or attributes for the new file and saved with the new file.

In another embodiment, an article of manufacture has a tangible computer-readable storage medium with computer readable program code embodied therewith, the computer readable program code comprising instructions that, when executed by a computer processing unit, cause the computer processing unit to determine if a new file is being created or saved for the first time, or if instead an existing file is being updated, modified, renamed, copied or moved, in response to a file command input. If a new file is being created or saved for the first time, core elements are determined that include an original device identifier unique to a device on which the new file is being created or saved for the first time; an original product identifier unique to a software product used to create or save the new file for the first time; an original operating system identifier unique to an operating system used to create or save the new file for the first time; an original user identifier unique to a user creating or saving the new file for the first time; a checksum computed from a totality of a data content of the new file; and a name of a checksum algorithm used to compute the checksum. If the new file is being created or saved for the first time, a plurality of extended elements are determined including a current file name of the file, a current format of the file, and a last-modified timestamp that comprises a time, date and time zone of a last creation or saving operation on the new file by the device. A universal file code is created for the new file comprising core and extended elements, and the created universal file code is added to file metadata or attributes for the new file and saved with the new file.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
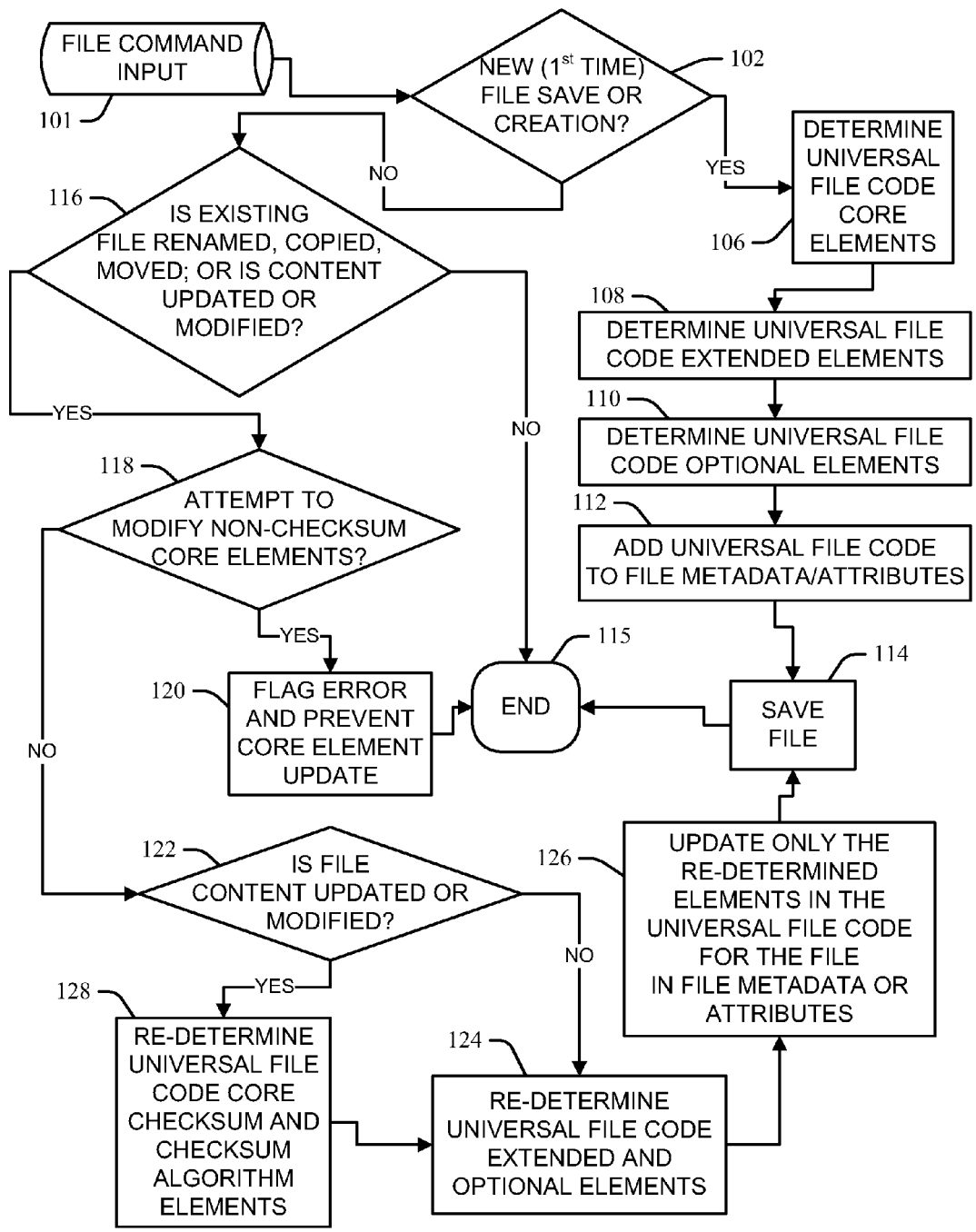
FIG. 1 is a block diagram illustration of an embodiment of the present invention that constructs or updates a unique, universal file code for a file.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates an embodiment of the present invention for constructing or updating a unique, universal file code for a file. In response to a file command input 101 (for example, a save, save as, move, copy, rename or other content creation, modification or update command input), at 102 the embodiment determines if a new file is being created or saved for the first time. If so, then a universal file code (sometimes referred to as "UFC") is created for the file. The UFC may be described as a composite code comprising core, extended and optional elements.

Accordingly, at 106 the UFC core elements are determined or calculated. The core elements are attributes of the UFC which will be unique to each file and remain constant even if a file is moved, copied, renamed or its format is changed. In this fashion, core elements together may uniquely identify a file across different copies and variations. In one embodiment, the core elements comprise some or all of the following:

(1) Original Device ID: This is a unique identifier of the device on which the file is originally created or first saved. Each device has a unique hardware ID by which it can be identified; for example, a physical media access control (MAC) address for a desktop or laptop, a disk ID for a hard disk, an International Mobile Equipment Identifier (IMEI) number for a smart phone, etc.

(2) Original Product ID: This is a unique identifier or license key of a software product used to create the file.

(3) Original OS ID: The unique identifier or license key of the operating system used to create the file.

(4) Creation Timestamp: This is the timestamp and time zone when the file is first created.

(5) Original User ID: This may be any user information that is unique and verifiable of the user who created the file, for example a user ID, login ID, email ID or full address, etc.

(6) Original Host ID: The hostname or host ID of the machine or device where the original file was created.

(7) Original Filename: The original filename including a file extension when the file was first saved.

(8) Original Fileformat: The original format in which the file was first saved. This may be a file extension or any other standardized string which represents a file format uniquely.

(9) Security Token: A unique security identifier which cannot be duplicated, inserted to preserve file identity and prevent fraudulent creation of a duplicate file with the same UFC core elements.

(10) Checksum: A checksum or hash sum is a fixed-size datum computed from an arbitrary block of digital data (such as a file) for the purpose of detecting accidental errors that may have been introduced during its transmission or storage. The integrity of the data can be checked at any later time by re-computing the checksum and comparing it with the stored one. If the checksums match, the data were almost certainly not altered (either intentionally or unintentionally). Checksum may be computed through a checksum algorithm.

(11) Checksum Algorithm: The name of the algorithm which was used to calculate the checksum. Illustrative but not exhaustive examples include the Message-Digest Algorithm MD5, and Secure Hash Algorithms (SHA), including SHA, SHA-1, SHA-256, etc.

(12) Archive Flag: This is a Boolean value which indicates if a file is an archive file or not, and may also be indicative of the type of archive process used, often indicated by a filename extension. Illustrative but not exhaustive examples include ".zip" for a PKZip process, ".mar" for a Mozilla archive, ".cab" for a Cabinet archive file, ".rar" for a Roshal archive process, etc.

Still other embodiments may use only some of the above, or other, core element constituents.

At 108 extended elements of the UFC are calculated or determined. These elements are unique to a given version and format of a file, but they may change if a file is renamed or its format is changed. In the present embodiment, these comprise:

(i) The current name of the file (filename), including a file extension if applicable. This may be the same or different from an original filename, depending on whether a file has been renamed or not.

(ii) The current file format. This may be a file extension or some other standardized string which represents a file format uniquely. If the original file format is different from the current file format, the original file may have been converted or trans-coded through one or more steps into its current format.

(iii) A last-modified timestamp. This indicates a timestamp and time zone when the file was last modified.

Once again, other embodiments may use only some of the above, or other, UFC extended element constituents.

At 110 optional UFC elements may also be calculated or determined. These may be used to include additional information on a specific version or instance of a file In one embodiment, these comprise file set data, including:

(a) A File-set Flag, which is a Boolean value which indicates whether a file is a part of a set of files. For example, a VMware image consists of multiple files which must all be available for the VMware image to work correctly, and this flag is used to relate the files to each other.

(b) File-set ID: A unique value which represents a unique position of the new file within a sequence in the overall set of files, of which this file is a part.

(c) File-set Minimum: The minimum sequence size of the file set.

(d) File-set Maximum: The maximum sequence size of the file set.

Once again, other embodiments may use only some of the above, or other, optional element constituents for the UFC.

At 112, the UFC (comprising the 106 core, 108 extended and any 110 optional elements) is added to file metadata or attributes for the new file, and the file then created or saved at 114, and the process ends at 115.

If at 102 a new file is not being created or saved for the first time, at 116 it is determined if the file command input at 101 is a either a file rename, copy or move command wherein the file content is not modified, or if the file command input 101 updates or otherwise modifies content of an existing file. If the command meets neither of these conditions (the answer is no to all), then the process ends at 115. However, if either/any of the conditions are met at 116 (the answer is yes to any), then at 118 it is determined if the present file operation is an attempt to update any existing UFC core elements for the file except Checksum. If so, then at 120 an error flag or other error determination and notice is generated, the determined update of the non-Checksum UFC core elements is prevented, and the present file operation ended at 115. (More particularly, the extant UFC content would have been created for the existing file at its first creation and saved to its metadata or attributes, for example pursuant to the steps 106, 108, 110, 112 and 114 described above.) In one aspect, this prevents inadvertent or intentional updates of said non-Checksum UFC core elements when a file is renamed, copied or moved, or its content updated or otherwise modified.

Otherwise, if any of the 116 conditions are met (the answer is yes to any of the conditions), and at 118 it is determined that the present file operation is not an attempt to update the non-Checksum UFC core elements, then the embodiment diverges at 122 based upon the type of affirmative answer recognized at 116. Thus, if the command input 101 does not update or otherwise modify existing file content (but is instead a file rename, copy or move command), then at 124 the extended and optional elements of the UFC are re-determined, but wherein all of the core elements (including checksum and checksum algorithm elements) remain unchanged. Else, if instead determined at 122 that the content of the existing file is updated or modified, then at 128 the checksum and checksum algorithm elements of the core elements are re-determined, but wherein all of the other core elements remain unchanged, and the extended and optional elements of the UFC also re-determined at 124.

At 126 the UFC content for the existing file is updated. More particularly, only those UFC elements recalculated at either 124 or 128 are updated. The updated UFC and file and thus saved at 114, the process then ending at 115.

Figure 2:
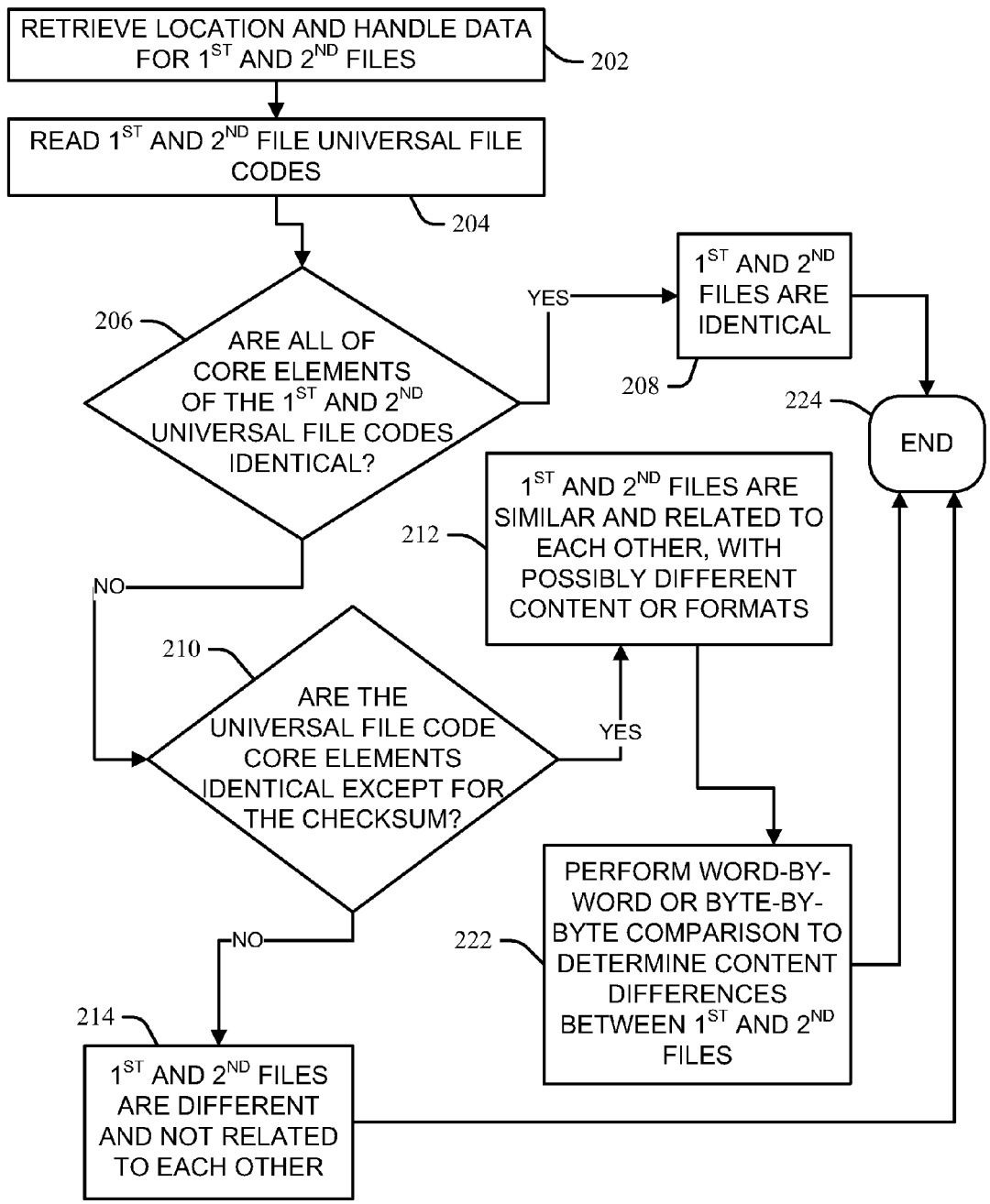
FIG. 2 is a block diagram illustration of an embodiment of the present invention that determines whether two files are the same based on comparing universal file codes determined according to FIG. 1.

FIG. 2 illustrates an embodiment for determining whether two files are the same based on the UFC determined pursuant to FIG. 1. At 202 the embodiment retrieves a location and handle for each of first and second files. At 204 the UFC is read for each of the files from the location and handle data, and corresponding core UFC elements are compared at 206. If all of the core elements are identical between the first and the second universal file codes, then the files are determined to be the same or identical at 208 (for example, one is a copy or other duplicate of the other), and the process is ended at 224.

However, if all of the core UFC elements compared at 206 are not identical, then at 210 it is determined whether only the checksum elements differ, with the remainder of the core elements identical between the 1st and 2nd UFC's. If so, then at 212 it is determined that the files are not identical but are similar and related to each other, wherein they may have different content or a different format (for example, they may have the same content but are saved in different formats, or they may share the same filename and format but have a difference in data content). Accordingly, at 222 word-by-word or byte-by-byte comparison may be optionally performed using available algorithms to determine content differences between the first and second files, and the process ended at 224. Otherwise, if the remainder of the core elements not including the checksum element are not the same as determined at 210, then at 214 it is determined that the files are different from each other and are not related to each other, and the process is ended at 224.

Thus, embodiments of the present invention create and use unique, universal file code identifiers as part of the standard file metadata or file attributes to reliably determine whether two files of any type and format are the same or related, or neither, simply by comparing the unique universal file code values, without the need for comparing their content. This differs from prior art approaches that make such determinations merely by comparing filenames, or those that compare content in text, document, spreadsheet, web page and other files (generally via a word-by-word or byte-by-byte comparison) to determine differences or identify duplicate files.

Prior art solutions which compare file content are algorithm-dependent for their accuracy. Data re-duplication solutions for identifying duplicate files may also rely on a combination of content and filename comparison and directory search algorithms. Problems arise in application of such systems as files do not have any single attribute or metadata which is both unique and universally utilized across all formats and applications: no reliable, unique file indicia exists for use in determining whether two files are the same or not.

In contrast, embodiments of the present invention construct and use a unique file ID or key which can help in reliably determining whether two or more files are the same, independent of any content comparison and appropriate for use universally, thus with all types of files and formats, and across different devices, media and locations. Such universal file codes are created or assigned to a file when the file is created and saved for the first time in any device or location and become part of the core metadata for the file, as a file attribute, and are recognizable by different operating systems and devices. The UFC value for a file may be stored as a file attribute or in a universal repository. similar to UDDI or in any other way.

Prior art processes that rely upon hash codes or checksums alone in determining file duplicates are not sufficient to determine whether two files are the same or not, even though their contents may be identical. In one exemplary illustration, the following test steps are performed to determine whether checksums are the same and thereby if the file content is the same, in case of a new file creation, file copy and file renaming:

Step (1): create a text file "TestFile1.txt" via a Notepad™, a common text-only application created for use with the Windows® operating system, add some content, save the file to a folder on a file system with the filename "TestFile1.txt," and close the file and Notepad. (WINDOWS is a registered trademark of Microsoft Corporation in the United States and other countries.) (This file is opened again for reading only by Notepad in Steps (2) and (3) described below.)

Step (2): The Notepad application is opened by itself in a first window, which displays a blank untitled file. The file TestFile1.txt created in Step (1) is opened separately in Notepad in a second window. The contents of TestFile1.txt are copied from the second window into the blank, untitled file in the first window in Notepad. The second window with TestFile1.txt is closed (without any changes to TestFile1.txt). The blank untitled file in the first window is saved as a new text file, "TestFile2.txt," and the file is closed. The Notepad application is also closed Step (3): Microsoft Word is opened by itself (in a first window). It shows a blank untitled document Document1. The file TestFile1.txt created in Step (1) is opened separately in Notepad (second window). The contents of TestFile1.txt are copied from the second window into Document1 in the first window in Microsoft Word. The second window with TestFile1.txt is closed (without any changes to TestFile1.txt). Document1 in the first window is saved as a new Word document file TestFile3.doc, and the file is closed. Microsoft Word application is also closed.

Step (4): At the file system level (in Windows® Explorer), TestFile1.txt is copied to a new file in the same folder "Copy of TestFile1.txt", which is renamed as "TestFile1Copy.txt".

Step (5): At the file system level (in Explorer), TestFile1.txt is copied to a new file in the same folder "Copy of TestFile1.txt", which is renamed as "TestFile1Copy.doc" including change in file extension.

Step (6): At the file system level (in Explorer), TestFile1.txt is again copied to a new file in the same folder "Copy of TestFile1.txt", which is renamed as "TestFile1Copy2.doc" including change in file extension.

Step (7): The file "TestFile1Copy2.doc" created in Step (6) is opened using Microsoft Word. No changes are made to the file "TestFile1Copy2.doc", and using the "Save As . . . " functionality in Word, it is saved to a new file "TestFile1Copy2SavedWithWord.doc", with identical content as the file "TestFile1Copy2.doc".

Step (8): "FastSum," a MD5 checksum utility algorithm (http://www.fastsum.com) is used to generate MD5 checksums for all of the (seven) files created in Steps (1) to (7) above The following examples illustrate how the files created in Steps (1) to (7) would compare with the first, original file, "TestFile1.txt" if the file's Unique File Identifiers (UFCs) comprising the Core Parameters (CP), Extended Parameters (EP) and Optional Parameters (OP) as described above with respect to FIGS. 1 and 2, wherein the checksum for a file is one of the parameters under CP and is inbuilt into the UFC:

TestFile1.txt: UFC#1=CP#1+EP#1+OP#1; Checksum#1 in CP#1.

TestFile2.txt: UFC#2=CP#2+EP#2+OP#2; Checksum#2 in CP#2=Checksum#1 in CP#1.

TestFile3.doc: UFC#3=CP#3+EP#3+OP#3; Checksum#3 in CP#3 does not equal Checksum#1 in CP#1, even though content is the same. This is because Microsoft Word adds its own metadata when saving a new file.

TestFile1Copy.txt: UFC#4=CP#1+EP#4+OP#4; Checksum#4 in CP#4=Checksum#1 in EP#1.

TestFile1Copy.doc: UFC#5=CP#1+EP#5+OP#5; Checksum#5 in CP#5=Checksum#1 in EP#1. This is because the file extension change has been done at a file system level, and the document has not been subsequently edited by Microsoft Word.

TestFile1Copy2.doc: UFC#6=CP#1+EP#6+OP#6; Checksum#6 in CP#6=Checksum#1 in EP#1. This is because the file extension change has been done at a file system level, and the document has not been subsequently edited by Microsoft Word.

TestFile1Copy2SavedWithWord.doc: UFC#7=CP#7+EP#7+OP#7; Checksum#7 in CP#7 does not equal Checksum#1 in EP#1, even though content is the same, because Microsoft Word adds its own metadata when saving a new file. Furthermore, Checksum#7 in CP#7 does not equal Checksum#6 in EP#6, even though content is same, again because Microsoft Word adds its own metadata when saving a new file.

Therefore, these examples prove that checksum alone is not a reliable mechanism to determine whether two files have the same content or not. Hash signatures, checksums, etc., are good mechanisms for comparing files from a content perspective. They help ensure that two files have the same content and have not been tampered or modified in any way. However, hash mechanisms rely on hash functions, which are mathematical functions that convert a defined set of data into a hash value or hash signature, and it is possible that a hash function may map two or more data sets to the same hash value (typically referred to as a collision in the context of hashing). This means that two or more files which are actually different may have the same hash value under certain circumstances leading to a "false positive". In contrast, though the UFC embodiments also use hash codes (via the checksum included in the extended parameters), two files having the same hash code value will only be identified as the same file if they also have the same core element data (origin, etc.), indicating that they have not been modified in any way).

In another aspect, embodiments of the present invention also accommodate any and all file naming nomenclature requirements within any given application. There are no restrictions or requirements as to the nomenclature that will impact file naming or renaming within the UFC construction and updating processes. In case of renaming, the first original name is retained within the core component of UFC, whereas the current filename is maintained within the extended components. As such, the UFC embodiments are tolerant of specific nomenclature requirements.

The core component of the UFC does not depend on the actual contents of the file. The core component is invariant and remains constant even if the file is moved or copied to other locations or devices. The checksum elements of the core component of the UFC may change if a file is modified or updated (for example, content is changed or the file is transformed from one format to another. Thus, for two files, if the core components of their respective UFC's are the same, then the files are identical. If the core components of the UFC are the same except for the checksum elements, then the files are similar and related to each other, and one or more of the processes of FIG. 2 at 222 may be used to determine the differences between the files. If the core components of the respective UFCs are different, then the two files are different and not related to each other.

UFC's according to the present invention are also distinguished over other unique indicia used in other prior arts. For example, email applications may use unique IDs for differentiating emails, such as "MessageIDs." However, such ID's are not related to any specific individual email file, but are instead associated with multiple individual emails within a given overall, encompassing single inbox or other file, such as a single "*.pst" or *.nsf" file: this is not a file-level unique ID, as the file comprises many individual emails with different ID's.

The use of unique IDs for resource identification is also practiced as primary keys in databases, and via "DocID" in Lotus Notes® or other document repositories. (LOTUS NOTES is a registered trademark of International Business Machines Corporation in the United States or other countries.) However, such ID's are created and used within given repository contexts, for example as used within document archival systems assigning a file ID for every file or document it stores, a digital asset management system assigning a unique ID for every asset ingested, or by a file system assigning IDs to files stored within, etc. In these constructs, the file ID or unique ID is associated by the repository, and relies upon the repository for its significance and unique status maintenance, as well as its validity; it is generally not valid or trustworthy or used outside of the particular repository application, absent some other way to verify and validate the ID. It is not a universally useful and recognized unique property or attribute of the file itself, in contrast to the UFC embodiments described above, which instead are property of the files themselves, and are universally applicable to files of any type, format, and across all kinds of devices.

Figure 3:
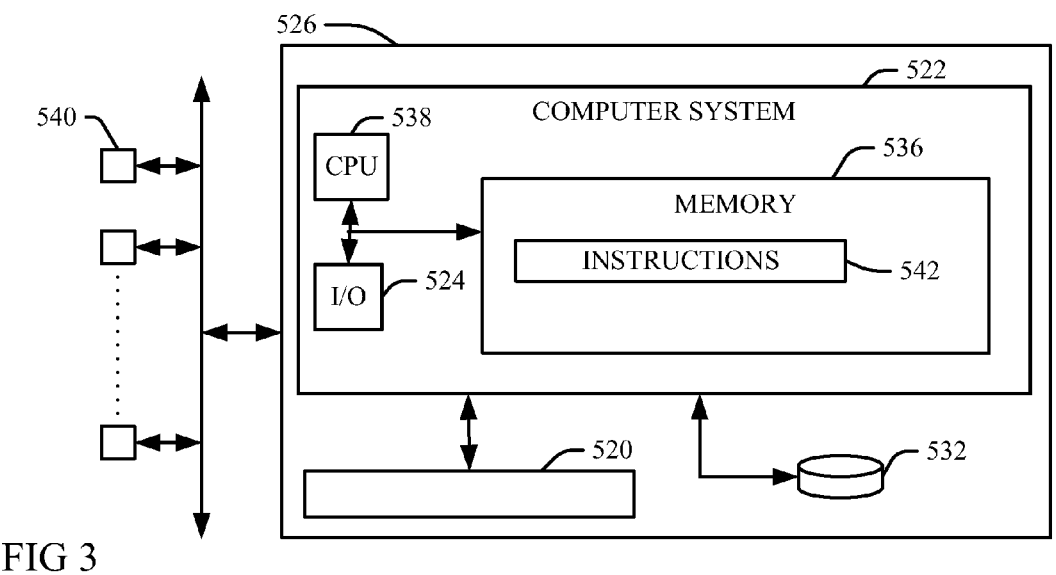
FIG. 3 is a block diagram illustration of a computerized implementation of an embodiment of the present invention.

Referring now to FIG. 3, an exemplary computerized implementation of an embodiment of the present invention includes a computer system or other programmable device 522 in communication with network file data sources 540. Instructions 542 reside within computer readable code in a computer readable memory 536, or in a computer readable storage system 532, or other tangible computer readable storage medium that is accessed through a computer network infrastructure 526 by a processing unit (CPU) 538. Thus, the instructions, when implemented by the processing unit (CPU) 538, cause the processing unit (CPU) 538 to construct or update a unique, universal file code for a file, or determine whether two files are the same based on comparing their universal file codes, as discussed above with respect to FIGS. 1 and 2.

Embodiments of the present invention may also perform process steps of the invention on a subscription, advertising, and/or fee basis. That is, a service provider could offer to integrate computer-readable program code into the computer system 522 to enable the computer system 522 to construct or update a unique, universal file code for a file, or determine whether two files are the same based on comparing their universal file codes, as discussed above with respect to FIGS. 1-3. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for utilizing a unique, universal file code for a file, the method comprising:
in response to determining by a processing unit that a new file is being created for the first time, the processing unit determining each of a plurality of core elements comprising:
a unique hardware identifier that is unique to a device on which the new file is being created, wherein the unique hardware identifier is media access control address, a disk identifier or an international mobile equipment identifier number;
a software product license key that is unique to a software product used by the device to create the new file;
an operating system identifier that is unique to an operating system used by the device to create the new file;
a user identifier that is unique to a user creating the new file;
a checksum computed from a totality of a data content of the new file; and
a name of a checksum algorithm used to compute the checksum;
the processing unit creating a universal file code for the new file comprising the plurality of the core elements;
the processing unit adding the created universal file code to file metadata of the new file; and
saving the new file with the created universal file code added to the file metadata of the new file.

2. The method of claim 1, further comprising:
in response to determining that the new file is being created for the first time, the processing unit determining each of a plurality of extended elements comprising a current file name of the file, a current format of the file, and a last-modified timestamp that comprises a time, date and time zone of a last creation or saving operation on the new file by the device, and creating the universal file code for the new file to further comprise the plurality of the extended elements;
in response to determining that an existing file is being updated, modified, renamed, copied or moved, the processing unit determining if content of the existing file is being updated or modified; and
in response to determining that the content of the existing file is not being updated or modified:
re-determining each of the plurality of the extended elements of a current universal file code that is saved to file metadata of the existing file;
updating the current universal file code with the re-determined extended elements to generate an updated universal file code for the existing file; and saving the existing file with the updated universal file code added to the file metadata of the existing file, wherein each of the plurality of the core elements of the updated universal file code remain unchanged from the plurality of the core elements of the current universal file code of the existing file.

3. The method of claim 2, further comprising:
if determined that the content of the existing file is being updated or modified:
re-determining the checksum and the checksum algorithm name elements of the plurality of core elements of the current universal file code that are saved to the file metadata of the existing file;
re-determining each of the plurality of the extended elements of the current universal file code that are saved to the file metadata of the existing file;
updating the current universal file code with the re-determined checksum and checksum algorithm name core elements and the re-determined extended elements to generate the updated universal file code for the existing file; and
saving the existing file with the updated universal file code added to file metadata of the existing file, wherein each of a remaining plurality of the core elements of the updated universal file code that are not the checksum and the checksum algorithm name elements remain unchanged from the plurality of the core elements of the current universal file code of the existing file.

4. The method of claim 3, further comprising:
if determined that the new file is being created for the first time, determining a plurality of optional elements comprising:
a file-set flag element that relates the new file to another file in a set of related files;
a unique file-set identification element that represents a unique position of the new file within a sequence of the related files in the set of related files;
a file-set minimum element that indicates a minimum size of the sequence comprising the new file; and
a file-set maximum element that indicates a maximum size of the sequence comprising the new file; and
wherein the step of creating the universal file code for the new file further comprises including the plurality of determined optional elements into the universal file code; and
re-determining a plurality of each of the optional elements of the current universal file code that are saved to the file metadata of the existing file if determined that the existing file is being updated, modified, renamed, copied or moved, or that the content of the existing file is being updated or modified; and
wherein the steps of updating the current universal file code and saving the existing file with the updated universal file code added to the file metadata of the existing file each further comprise updating the current universal file code with the re-determined optional elements and saving the existing file with the updated universal file code added to file metadata of the existing file.

5. The method of claim 4, further comprising:
comparing each of the plurality of core elements of a first universal file code that is added to file metadata of a first file to corresponding elements of the plurality of core elements of a second universal file code that is added to file metadata of a second file;
determining that the first file and the second file are identical if all of the compared corresponding core elements are identical between the first and the second universal file codes;
determining that the first file and the second file are not identical but are related to each other if all of the compared corresponding core elements except for the checksum elements are identical between the first and the second universal file codes; and
determining that the first file and the second file are not identical and not related to each other if any of the compared corresponding core elements except for the checksum elements are not identical between the first and the second universal file codes.

6. The method of claim 5, further comprising:
performing a word-by-word or a byte-by-byte comparison to determine a content difference between the first file and the second file in response to the step of determining that the first file and the second file are not identical but are similar and related to each other.

7. The method of claim 1, further comprising:
integrating computer-readable program code into a computer system comprising the processing unit, a computer readable memory and a computer readable tangible storage medium, wherein the computer readable program code is embodied on the computer readable tangible storage medium and comprises instructions that, when executed by the processing unit via the computer readable memory, cause the processing unit to perform the steps of, determining each of the plurality of core elements in response to determining that the new file is being created for the first time, creating the universal file code for the new file; adding the created universal file code to the file metadata for the new file; and saving the new file with the created universal file code added to file metadata of the new file.

8. A system, comprising:
a processing unit in communication with a computer readable memory and a tangible computer-readable storage medium;
wherein the processing unit, when executing program instructions stored on the tangible computer-readable storage medium via the computer readable memory:
in response to determining that a new file is being created for the first time, determines each of a plurality of core elements comprising:
a unique hardware identifier that is unique to a device on which the new file is being created, wherein the unique hardware identifier is a media access control address, a disk identifier or an international mobile equipment identifier number;
a software product license key that is unique to a software product used by the device to create the new file;
an operating system identifier that is unique to an operating system used by the device to create the new file;
a user identifier that is unique to a user creating the new file;
a checksum computed from a totality of a data content of the new file; and
a name of a checksum algorithm used to compute the checksum;
creates a universal file code for the new file comprising the plurality of the core extended elements;
adds the created universal file code to file metadata for the new file; and
saves the new file with the created universal file code added to the file metadata of the new file.

9. The system of claim 8, wherein the processing unit, when executing the program instructions stored on the computer-readable storage medium via the computer readable memory, further:
 in response to determining that the new file is being created for the first time, determines each of a plurality of extended elements comprising a current file name of the file, a current format of the file, and a last-modified timestamp that comprises a time, date and time zone of a last creation or saving operation on the new file by the device, and creates the universal file code for the new file to further comprise the plurality of the extended elements;
 in response to determining that an existing file is being updated, modified, renamed, copied or moved, determines if content of the existing file is being updated or modified; and
 if determined that the content of the existing file is not being updated or modified:
  re-determines each of the plurality of the extended elements of a current universal file code that are saved to the file metadata of the existing file; and
  updates the current universal file code with the re-determined extended elements to generate an updated universal file code for the existing file; and
  saves the existing file with the updated universal file code added to the file metadata of the existing file, wherein each of the plurality of the core elements of the updated universal file code remain unchanged from the plurality of the core elements of the current universal file code of the existing file.

10. The system of claim 9, wherein the processing unit, when executing the program instructions stored on the computer-readable storage medium via the computer readable memory, further, if determined that the content of the existing file is being updated or modified:
 re-determines the checksum and the checksum algorithm name elements of the plurality of core elements of the current universal file code that are saved to the file metadata of the existing file;
 re-determines each of the plurality of the extended elements of the current universal file code that are saved to the file metadata of the existing file;
 updates the current universal file code with the re-determined checksum and checksum algorithm name core elements and the re-determined extended elements to generate the updated universal file code for the existing file; and
 saves the existing file with the updated universal file code added to the file metadata of the existing file, wherein each of a remaining plurality of the core elements of the updated universal file code that are not the checksum and the checksum algorithm name elements remain unchanged from the plurality of the core elements of the current universal file code of the existing file.

11. The system of claim 10, wherein the processing unit, when executing the program instructions stored on the computer-readable storage medium via the computer readable memory, further, if determined that the new file is being created for the first time:
 determines a plurality of optional elements comprising:
  a file-set flag element that relates the new file to another file in a set of related files;
  a unique file-set identification element that represents a unique position of the new file within a sequence of the related files in the set of related files;
  a file-set minimum element that indicates a minimum size of the sequence comprising the new file; and
  a file-set maximum element that indicates a maximum size of the sequence comprising the new file;
 creates the universal file code for the new file by including the plurality of determined optional elements into the universal file code; and
 re-determines a plurality of each of the optional elements of the current universal file code that are saved to the file metadata of the existing file if determined that the existing file is being updated, modified, renamed, copied or moved, or that the content of the existing file is being updated or modified; and
 updates the current universal file code and saves the existing file with the updated universal file code added to the file metadata of the existing file by updating the current universal file code with the re-determined optional elements and saving the existing file with the updated universal file code added to file metadata of the existing file.

12. The system of claim 11, wherein the processing unit, when executing the program instructions stored on the computer-readable storage medium via the computer readable memory, further:
 compares each of the plurality of core elements of a first universal file code that is added to file metadata of a first file to corresponding elements of the plurality of core elements of a second universal file code that is added to file metadata of a second file;
 determines that the first file and the second file are identical if all of the compared corresponding core elements are identical between the first and the second universal file codes;
 determines that the first file and the second file are not identical but are related to each other if all of the compared corresponding core elements except for the checksum elements are identical between the first and the second universal file codes; and
 determines that the first file and the second file are not identical and not related to each other if any of the compared corresponding core elements except for the checksum elements are not identical between the first and the second universal file codes.

13. An article of manufacture, comprising:
 a computer readable tangible storage medium having computer readable program code embodied therewith, the computer readable program code comprising instructions that, when executed by a computer processing unit, cause the computer processing unit to:
 in response to determining that a new file is being created for the first time, determine each of a plurality of core elements comprising:
  a unique hardware identifier that is unique to a device on which the new file is being created for the first time, wherein the unique hardware identifier is a media access control address, a disk identifier or an international mobile equipment identifier number;
  a software product license key that is unique to a software product used by the device to create the new file;
  an operating system identifier that is unique to an operating system used by the device to create the new file;
  a user identifier that is unique to a user creating the new file;
  a checksum computed from a totality of a data content of the new file; and
  a name of a checksum algorithm used to compute the checksum;

create a universal file code for the new file comprising the plurality of the core elements;
add the created universal file code to file metadata for the new file; and
save the new file with the created universal file code added to the file metadata of the new file.

14. The article of manufacture of claim 13, wherein the computer readable program code instructions, when executed by the computer processing unit, further cause the computer processing unit to:
in response to determining that the new file is being created for the first time, determine each if a plurality of extended elements comprising a current file name of the file, a current format of the file, and a last-modified timestamp that comprises a time, data and time zone of a last creation or saving operation on the new file by the device, and create the universal file code for the new file to further comprise the plurality of the extended elements;
in response to determining that an existing file is being updated, modified, renamed, copied or moved, determine if the content of the existing file is being updated or modified; and
in response determining that the content of the existing file is not being updated or modified:
re-determine each of the plurality of the extended elements of a current universal file code that are saved to the file metadata of the existing file;
update the current universal file code with the re-determined extended elements to generate an updated universal file code for the existing file; and
save the existing file with the updated universal file code added to the file metadata of the existing file, wherein each of the plurality of the core elements of the updated universal file code remain unchanged from the plurality of the core elements of the current universal file code of the existing file.

15. The article of manufacture of claim 14, wherein the computer readable program code instructions, when executed by the computer processing unit, further cause the computer processing unit to, if determined that the content of the existing file is being updated or modified:
re-determine the checksum and the checksum algorithm name elements of the plurality of core elements of the current universal file code that are saved to the file metadata of the existing file;
re-determine each of the plurality of the extended elements of the current universal file code that are saved to the file metadata of the existing file;
update the current universal file code with the re-determined checksum and checksum algorithm name core elements and the re-determined extended elements to generate the updated universal file code for the existing file; and
save the existing file with the updated universal file code added to the file metadata of the existing file, wherein each of a remaining plurality of the core elements of the updated universal file code that are not the checksum and the checksum algorithm name elements remain unchanged from the plurality of the core elements of the current universal file code of the existing file.

16. The article of manufacture of claim 15, wherein the computer readable program code instructions, when executed by the computer processing unit, further cause the computer processing unit to, if determined that the new file is being created for the first time:
determine a plurality of optional elements comprising:
a file-set flag element that relates the new file to another file in a set of related files;
a unique file-set identification element that represents a unique position of the new file within a sequence of the related files in the set of related files;
a file-set minimum element that indicates a minimum size of the sequence comprising the new file; and
a file-set maximum element that indicates a maximum size of the sequence comprising the new file;
create the universal file code for the new file by including the plurality of determined optional elements into the universal file code; and
re-determine a plurality of each of the optional elements of the current universal file code that are saved to the file metadata of the existing file if determined that the existing file is being updated, modified, renamed, copied or moved, or that the content of the existing file is being updated or modified; and
update the current universal file code and save the existing file with the updated universal file code added to the file metadata of the existing file by updating the current universal file code with the re-determined optional elements and save the existing file with the updated universal file code added to file metadata of the existing file.

17. The article of manufacture of claim 13, wherein the computer readable program code instructions, when executed by the computer processing unit, further cause the computer processing unit to:
compare each of the plurality of core elements of a first universal file code that is added to file metadata of a first file to corresponding elements of the plurality of core elements of a second universal file code that is added to file metadata of a second file;
determine that the first file and the second file are identical if all of the compared corresponding core elements are identical between the first and the second universal file codes;
determine that the first file and the second file are not identical but are related to each other if all of the compared corresponding core elements except for the checksum elements are identical between the first and the second universal file codes; and
determine that the first file and the second file are not identical and not related to each other if any of the compared corresponding core elements except for the checksum elements are not identical between the first and the second universal file codes.

* * * * *